(12) United States Patent
Hartman et al.

(10) Patent No.: US 6,915,339 B2
(45) Date of Patent: Jul. 5, 2005

(54) ECHO LOCATOR FOR COMPUTER NETWORK

(75) Inventors: Nicole Dawn Hartman, Austin, TX (US); David Warren Kline, Cedar Park, TX (US); Yuan-Chang Lo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 09/726,284

(22) Filed: Nov. 30, 2000

(65) Prior Publication Data

US 2002/0065904 A1 May 30, 2002

(51) Int. Cl.[7] .............................................. G06F 15/177
(52) U.S. Cl. ........................ 709/220; 709/221; 709/222; 713/100
(58) Field of Search ................................. 709/220, 221, 709/222, 227, 228, 224, 223, 245, 250; 370/252; 713/100

(56) References Cited

U.S. PATENT DOCUMENTS

| | | | | |
|---|---|---|---|---|
| 5,724,510 A | * | 3/1998 | Arndt et al. | 709/220 |
| 5,835,720 A | * | 11/1998 | Nelson et al. | 709/224 |
| 6,061,723 A | * | 5/2000 | Walker et al. | 709/224 |
| 6,286,047 B1 | * | 9/2001 | Ramanathan et al. | 709/224 |
| 6,360,276 B1 | * | 3/2002 | Scott | 709/245 |
| 6,473,811 B1 | * | 10/2002 | Onsen | 710/15 |
| 6,510,515 B1 | * | 1/2003 | Raith | 713/163 |
| 6,532,217 B1 | * | 3/2003 | Alkhatiba et al. | 370/252 |
| 6,542,928 B1 | * | 4/2003 | Hammons | 709/221 |
| 6,591,306 B1 | * | 7/2003 | Redlich | 709/245 |
| 6,654,382 B1 | * | 11/2003 | Bare et al. | 370/463 |
| 6,675,206 B1 | * | 1/2004 | Britton et al. | 709/220 |
| 6,677,852 B1 | * | 1/2004 | Landt | 340/10.1 |

* cited by examiner

*Primary Examiner*—Ario Etienne
*Assistant Examiner*—Abdullahi E. Salad
(74) *Attorney, Agent, or Firm*—Joseph P. Lally; Casimer K. Salys; Joscelyn G. Cockburn

(57) ABSTRACT

A method and system for specifying a targeted device by its network address and inducing the targeted device to produce a user detectable action are disclosed. Initially, an echo locator is invoked by the user at a first device (the initiating device), such as by entering a predetermined keyboard sequence. Upon invoking the locator, the targeted device is then specified by the user with an IP address, a host name, or with some other suitable identifier. If the targeted device is specified indirectly, the locator determines the network device that is associated with the specified device. Once the targeted devices has been identified, the locator of the user device issues one or more messages such as ICMP echo requests that generate a response from the targeted device. In one embodiment, the echo requests do not produce a response unless a threshold number of locator requests are detected within a predetermined time limit.

21 Claims, 3 Drawing Sheets

ECHO LOCATOR FOR COMPUTER NETWORK

BACKGROUND

1. Field of the Present Invention

The present invention generally relates to the field of data processing networks and more particularly to a network enabled to facilitate identification of specified systems or devices of the network.

2. History of Related Art

Computer networks are becoming increasing prevalent in virtually every area where data processing systems are employed. In a typical network, a number of systems or devices are interconnected using wires (cables) or another suitable connection medium. The types of devices that a network may include vary widely with the implementation. Computer networks may include one or more terminals, desktop systems, servers, mainframes, routers, hubs, switches, printers, and various other devices that will be familiar to those skilled in the design of data processing networks. Within the network, individual devices may be assigned identification information such as an Internet protocol (IP) address. In such a network, the identification information may be assigned dynamically such that the identification information associated with a particular device or system may change with time. Dynamic assignment of IP addresses in a network can facilitate IP address management and can improve the efficiency of IP address assignment. When, for example, a particular device is logged off the network, its IP address can be made available for another device or system.

In a network with a large number of devices, however, the dynamic assignment of IP identification information such as IP addresses generally produces difficulty in determining the correlation between a particular IP address and the device to which it is currently assigned. In such an environment, valuable time and effort can be wasted simply determining which system is associated with a particular network address. In a network development environment, where network configuration changes may occur frequently, the ability to identify the device having a particular address easily is highly valuable. It would be, therefore, highly desirable to implement a method and system for easily identifying the correspondence between network devices and network addresses.

SUMMARY OF THE INVENTION

The problem identified above is in large part addressed by a method and system for specifying a targeted device by its network address and inducing the targeted device to produce a user detectable action such as by forcing the targeted device to make a beeping sound. Initially, an echo locator is invoked by the user at a first device (the initiating device), such as by entering a predetermined keyboard sequence. Upon invoking the locator, the targeted device is then specified by the user with an IP address, a host name, or with some other suitable identifier. If the targeted device is specified indirectly, such as with a host name, the locator determines the network address that is associated with the specified device. Once the address of the targeted device is known, the locator of the user device issues one or more messages such as ICMP echo requests that generate a response from the targeted device. In one embodiment, the echo requests do not produce a response unless a threshold number of locator requests are detected within a predetermined time limit.

BRIEF DESCRIPTION OF THE DRAWINGS

Other objects and advantages of the invention will become apparent upon reading the following detailed description and upon reference to the accompanying drawings in which.

Figure 1:
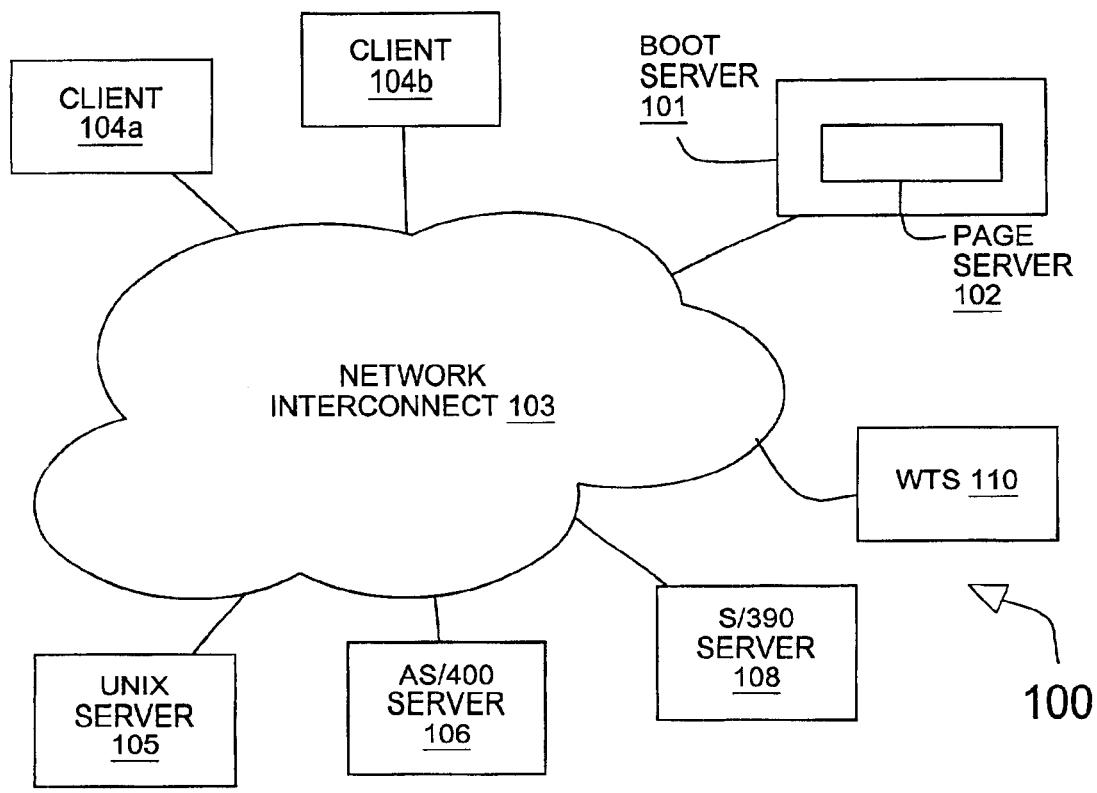
FIG. 1 illustrates an embodiment of a computer network suitable for implementing the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 depicts an exemplary computer network 100 in which the present invention may be employed advantageously. In the depicted embodiment, network 100 includes multiple data processing devices that are interconnected by a network interconnect 103. Network 100 and network interconnect 103 may be implemented with any of a variety of suitable topologies, physical media, and data communications protocols. In one common example, network 100 and interconnect 103 form a local area network (LAN) that supports the transmission control protocol/internet protocol (TCP/IP) suite of protocols and applications, which provide the foundation and framework for many computer networks including the Internet. TCP/IP is extensively documented in a variety of publications including M. Murhammer et al., *TCP/IP Tutorial and Technical Overview*, available online at www.redbooks.ibm.com (#GG24-3376-05) and incorporated by reference herein.

Figure 2:
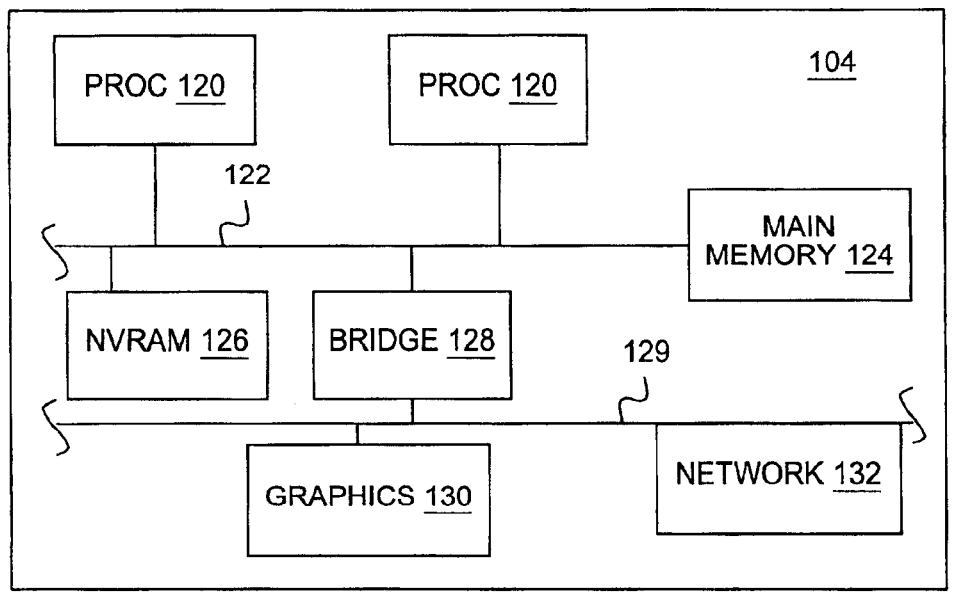
FIG. 2 is a block diagram of selected components of an embodiment of a user station of the computer network of FIG. 1.

Network 100 includes a variety of data processing device types including a boot server 101 that may include a corresponding code page server 102. Network 100 is shown as further including multiple user stations, also referred as thin clients or clients 104a and 104b (generically or collectively referred to herein as client(s) 104). Thin clients 104 refer generally to a class of low cost data processing devices that depend upon a remote host to supply their code pages for normal operation. Referring briefly to FIG. 2, client 104 may be designed with one or more processors 120 that are connected to a main memory or system memory 124 over a system bus or memory bus 122. Processors 120 may be implemented with any of a variety of microprocessors such as the PowerPC® processor from IBM Corporation.

Typically, client 104 includes a non-volatile storage device such as a ROM, EEPROM, or flash card, that may contain sufficient code to enable to client 104 to download an operating system from a network server such as boot server 101. Client 104 may also include a bus bridge 128 that couples system bus 122 to a peripheral bus 129. A peripheral bus, such as a Peripheral Components Interface (PCI) bus, connects various peripheral devices to system bus 122. The peripheral devices may include a graphics adapter 130 and a network adapter 132 through which client 104 is connected to network 100.

Clients 104 may be implemented with any of a variety of network station systems such as the NetVista™ line of thin client devices from IBM Corporation. The depicted embodiment of Network 100 further includes application server systems including, as examples, a Unix server such as an RS/6000® server 105, a business server such as an AS/400® server 106, and an enterprise server such as an S/390® server 108, all available from IBM Corporation. Network 100 may further include a Windows Terminal Server (WTS) 110 from Microsoft in combination with a software interface, such as Metaframe™ from Citrix Systems, Inc., that allows a client, such as Citrix ICA®, running on the thin client to access WTS 110. Although network 100 is illustrated as including a specific combination of network devices, those knowledgeable in the field of data processing networks will appreciate that network 100 may incorporate various combinations of the devices indicated in FIG. 1 and may include a variety of additional network devices not illustrated without departing from the spirit and scope of the disclosed network.

In one embodiment, network 100 supports a Dynamic Host Communication Protocol. DHCP is a network protocol that enables a properly configured server (a DHCP server) to automatically assign an internet protocol (IP) address to the TCP/IP stack of a client computer 104. A DHCP server assigns client 104 IP addresses dynamically from a pre-defined range of IP addresses for the network. Clients 104 configured to use DHCP for IP assignment do not need to have a statically assigned IP address and generally do not need to have addresses configured for a Domain Name Server (DNS), which can also be dynamically assigned by the DHCP server.

If client 104 includes a DHCP client, client 104 typically broadcasts a request when client 104 is booted such as by turning power on or by otherwise resetting client 104. The broadcasted request attempts to find a DHCP server that can answer the request. A router (not depicted) in network 100 may receive the request and direct client 104 to an appropriate DHCP server, which may be the boot server 101 depicted in FIG. 1. After the client 104 and DHCP server establish communication by exchanging appropriate handshaking signals, the server may assign an IP number from a range defined on the server. The DHCP server may also provide to client 104 other information such as the IP address of a gateway device, the IP address of a DNS server, the IP address of the boot server, as well as the path/filename used to configure client 104.

In a network 100 that supports dynamically assigned IP addresses, each of the devices described above, as well as other devices such as routers, hubs, network printers, and so forth, may have any of a range of IP addresses at any given instance in time. Thus, the relationship between physical devices and IP addresses in network 100 may vary with time. The present invention contemplates an elegant method and system that facilitates the identification of the physical device in a network such as network 100 that is currently assigned to a particular network address. The methods disclosed and claimed herein may be implemented and transported as a set or sequence of computer executable instructions (i.e., computer software) contained on any of a variety of computer readable media including as examples, persistent storage devices such as floppy disks, hard disks, CD ROM's, DVD's, magnetic tapes, EEPROM's, flash cards and so forth, as well as volatile memory devices such as static and dynamic RAM devices.

Figure 3:
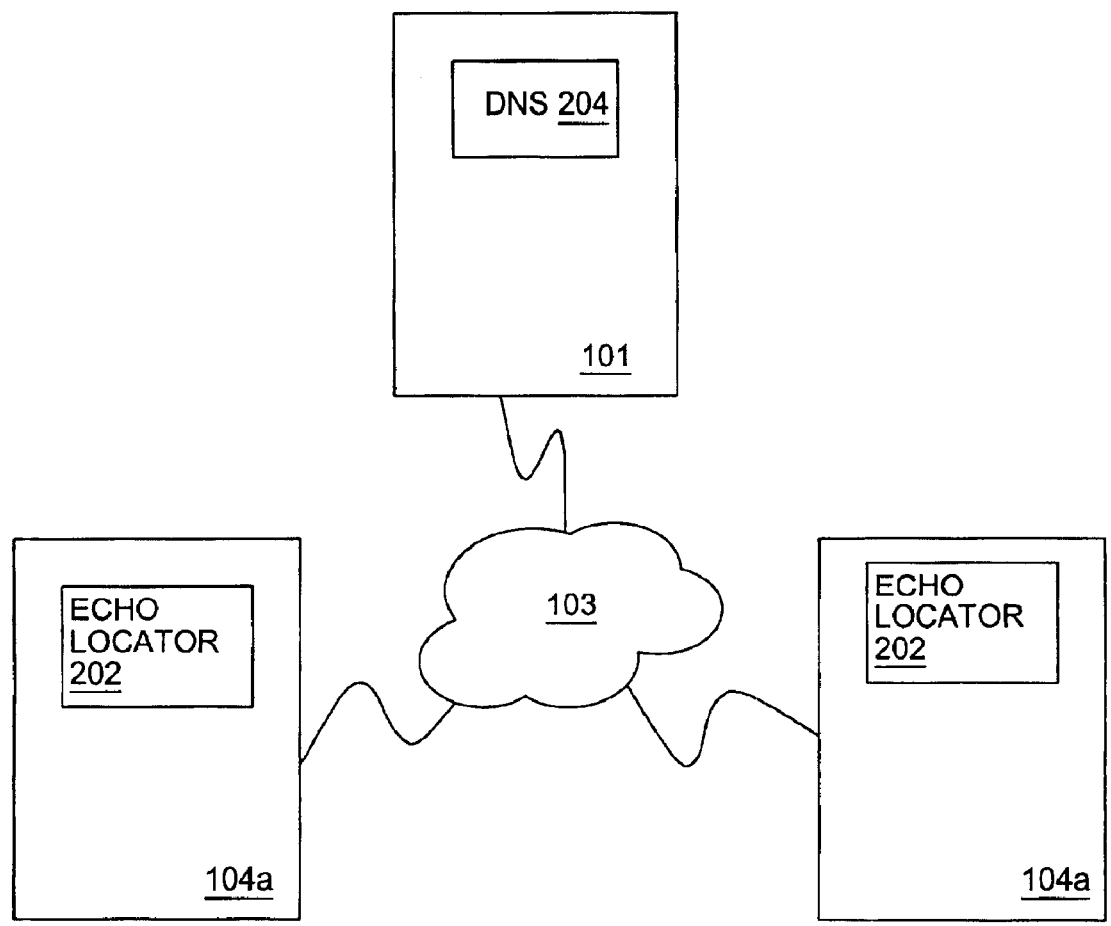
FIG. 3 illustrates selected components of the computer network of FIG. 1.

Referring now to FIG. 3, a block diagram of selected portions of the network 100 is depicted to illustrate one embodiment of the present invention. As depicted in FIG. 3, an echo locator module 202 is installed on various devices of network 100. Echo locator module may, for example, be integrated into the TCP/IP stack of each device on network 100. In the depicted embodiment, an echo locator 202 is installed on a first thin client 104a and on a second thin client 104b. Also depicted is a domain name server (DNS) 204, which may be located on a server of network 100 such as boot server 101. DNS 204 is typically responsible for maintaining an association between IP addresses and host names, where a host name is typically an English language substitute for the IP address.

In one embodiment, echo locator 202 is a user-invoked function of client 104 that elicits a user detectable action from a target device. The target device is a parameter of the function that the user specifies when echo locator 202 is invoked. By forcing the target device to perform an action that is audibly, visually, or otherwise detectable, echo locator 202 provides a mechanism with which the user can quickly and easily identify the particular device or system that is currently assigned to a specified network address. Echo locator 202 may include a module that "listens" for echo locator requests initiated by any other devices of network 100. When an echo locator request initiated by a first device specifies a second device as the target device, the echo locator on the second device will detect the request and respond with an action that is detectable by the user of the first device.

In one embodiment, echo locator 220 issues one or more Internet Control Message Protocol (ICMP) messages. ICMP messages are described in Internet Request for Comments (RFC's) 792 and 950, which are available online from a number of sites including www.faqs.org. ICMP is an integral part of IP that is typically supported by any device that supports IP. ICMP defines an echo message type and an echo return message type. The echo return is substantially identical to the echo message with the target and initiating devices reversed. The ICMP echo request and echo return are useful tools in determining the performance of a network. A first device, for example, can send an ICMP echo specifying a second device as the target device. The target device will respond with an echo return that is returned to the initiator of the echo message. From this sequence, the round trip delay between the first and second devices can be determined. In one embodiment, the present invention makes use of available ICMP message types to provide a mechanism for identifying the device in a network that corresponds to a specified network address.

Figure 4:
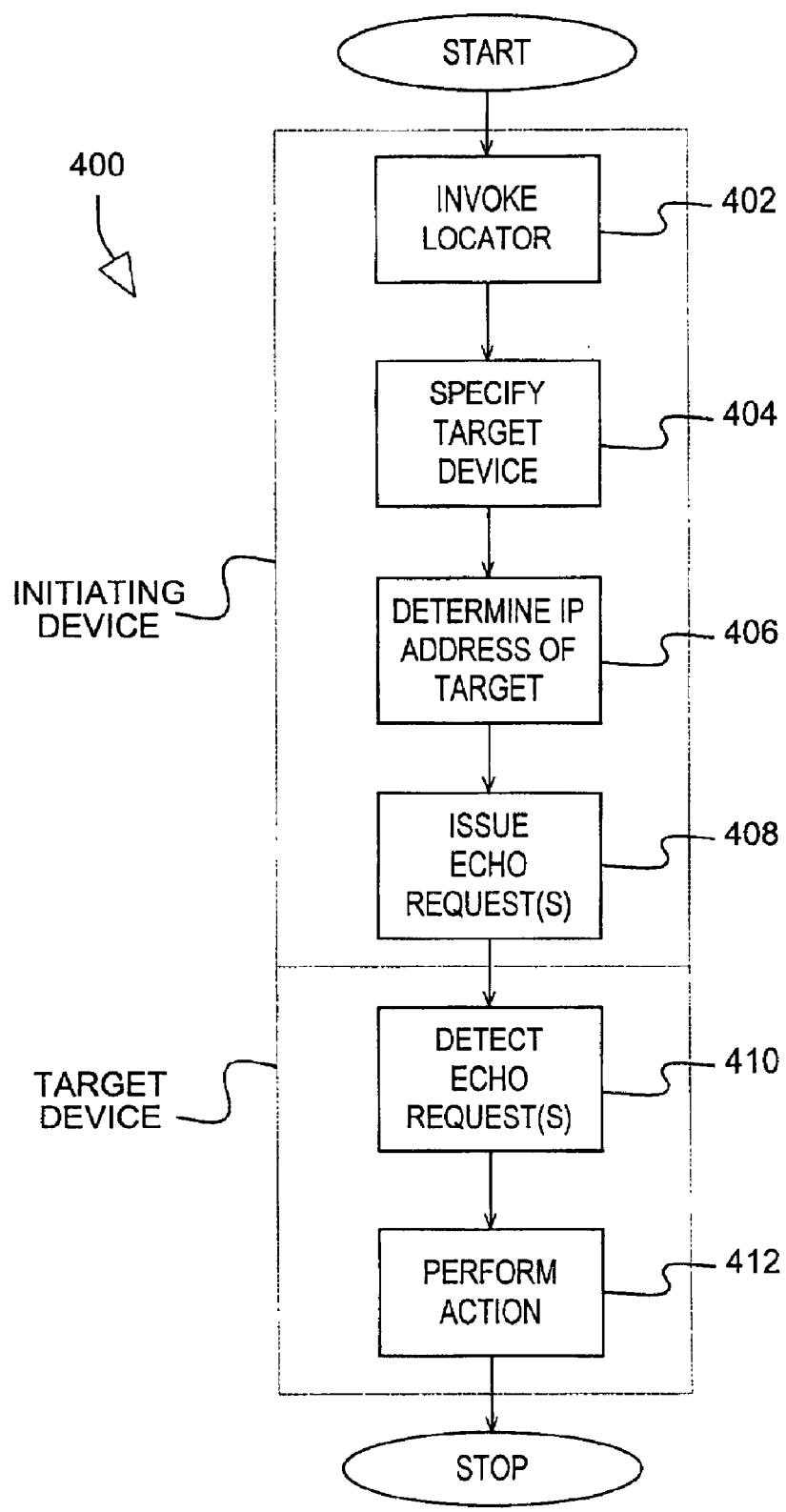
FIG. 4 is a flow diagram illustrating a method of identifying network devices according to one embodiment of the present invention.

Referring to FIG. 4, a flow diagram illustrating a method 400 of identifying network devices according to one embodiment of the invention is depicted. Initially, the locator 202 of FIG. 2 is invoked (block 402) by a user of the network. Locator 202 may be invoked, for example, by entering a pre-determined keyboard sequence. When locator 202 is invoked, the user is then queried to specify (block 404) the target device. In an IP supported network, the target device may be specified directly with the device's IP address, which typically includes a sequence of four numbers, each of which is between 0 and 255 (i.e., 78.23.107.212). Alternatively, the target device may be specified by its host name. In this embodiment, the locator 202 must determine (block 406) the IP address of the target device from the name specified by the user. If the user specifies the target device's host name, the determination of the correct IP address may be accomplished using DNS 204 (shown in FIG. 3), which maintains an association between network host names and network IP addresses.

Following the determination of the target device's IP address, locator 202 issues (block 408) one or more commands, such as an ICMP echo requests, that effectively "ping" a specified target. It is desirable to distinguish echo requests generated by locator 202 from other echo requests so that the targeted device may respond to echo requests appropriately. It is also desirable for integration purposes, however, if locator 202 uses a standard ICMP echo request. To address both of these concerns, one embodiment of locator 202 is configured to issue multiple identical ICMP echo requests each time the locator is invoked. The locator 202 of the target device may be configured to sense for a threshold number of echo requests within a predetermined time interval. If fewer than the threshold number of echo requests is detected, the locator 202 of the target device disregards the echo requests (although the targeted device may issue ICMP echo responses). If a number of echo requests in excess of the threshold number is detected (block 410) within the specified time period, the locator 202 of the target device responds by initiating an action that can be detected by the user located at the originating device.

In one embodiment, the locator 202 of the targeted device responds to receiving the threshold number of echo requests by issuing a hardware command that produces an audible sound or "beep." While some devices of network 100 may not include a sound card and speakers, substantially all hardware devices include sufficient hardware and software to produce a beep sound (such as a warning signal when an unrecognized keyboard sequence is executed). The locator 202 of the targeted device may generate multiple beep sounds depending upon the implementation. Because various devices may require different hardware commands to issue a beep sound, there may be some customization of the receiving portion of locator 202. In other embodiments, the targeted device may produce a visibly detectable signal in response to detecting the threshold number of echo requests. Such a signal might include, for example, displaying a predetermined graphic image, stored as part of locator 202, on a display screen of those devices that include display screens.

It will be apparent to those skilled in the art having the benefit of this disclosure that the present invention contemplates a system and method for identifying network devices. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of identifying a device in a computer network, comprising:
   indicating information that specifies the device;
   responsive to the information that specifies the device being indicated, issuing multiple identical instances of network command, each instance of the command targeting the specified device; and
   responsive to the targeted device receiving a number of the network commands exceeding a specified threshold, performing a user detectable action on the targeted device wherein the user detectable action enables the user to identify the targeted device.

2. The method of claim 1, wherein indicating information that specifies the device comprises indicating the Internet protocol (IP) address of the specified device.

3. The method of claim 1, wherein indicating information that specifies the device comprises indicating the host name of the specified device.

4. The method of claim 3, further comprising converting the host name to a corresponding IP address.

5. The method of claim 4, wherein converting the host name includes accessing a Domain Name Server (DNS) of the computer network.

6. The method of claim 1, wherein each of the identical network commands is an Internet Communication Messaging Protocol (ICMP) echo request.

7. The method of claim 1, wherein performing a user detectable action includes issuing an audible sound with the targeted device.

8. The method of claim 1, wherein performing the user detectable action includes displaying a predetermined image on a display device of the targeted device.

9. A computer network comprising:
   a first device connected to a network interconnect, the first device including processor, memory, input means, and display, wherein the memory of the first device contains processor executable instructions for identifying a device on the network, the instructions including:
      program code means enabling a user to indicate information that specifies the device; and
      program code means for responsive to the information that specifies the device being indicated, issuing multiple instances of a network command targeting the specified device; and
   a second device connected to the network interconnect, the second device including processor and memory, wherein the memory of the second device containing processor executable instructions including program code means for performing a user detectable action responsive to receiving a number of the network commands exceeding a specified threshold value.

10. The network of claim 9, wherein the program code means for indicating information that specifies the device include code means for indicating the Internet protocol (IP) address of the specified device.

11. The network of claim 9, wherein the program code means for indicating information that specifies the device comprises code means for indicating the host name of the specified device.

12. The network of claim 11, further comprising code means for converting the host name to a corresponding IP address.

13. The network of claim 12, wherein the code means for converting the host name include code means for accessing a Domain Name Server (DNS) of the computer network.

14. The network of claim 9, wherein the code means for issuing the network command include code means for issuing an Internet Communication Messaging Protocol (ICMP) echo request.

15. The network of claim 9, wherein the code means for performing a user detectable action include code means for issuing an audible sound with the targeted device.

16. The network of claim 9, wherein performing the user detectable action includes displaying a predetermined image on a display device of the targeted device.

17. A computer program product residing on a computer usable medium for identifying a device on a computer network, the computer program product comprising:
   program code means enabling a user to indicate information that specifies the device;

program code means for responding to information that specifies the device being indicated by issuing multiple instances of a network command targeting the specified device; and program code means for performing a user detectable action responsive to receiving a number of the network commands exceeding a specific threshold.

18. The computer program produce of claim 17, wherein the program code means for indicating information that specifies the device include code means for indicating the Internet protocol (IP) address of the specified device.

19. The computer program produce of claim 17, wherein the program code means for indicating information that specifies the device comprises code means for indicating the host name of the specified device.

20. The computer program produce of claim 19, further comprising code means for converting the host name to a corresponding IP address by accessing a Domain Name Server (DNS) of the computer network.

21. The computer program produce of claim 17, wherein the code means for performing a user detectable action include code means for issuing an audible sound with the targeted device.

* * * * *